United States Patent [19]
Furuya et al.

[11] Patent Number: 5,870,730
[45] Date of Patent: Feb. 9, 1999

[54] DECISION MAKING METHOD

[75] Inventors: Masatoshi Furuya, Edogawa-ku; Fuminobu Komura, Kouhoku-ku, both of Japan

[73] Assignee: Hitachi, Ltd, Tokyo, Japan

[21] Appl. No.: 499,203

[22] Filed: Jul. 7, 1995

[30] Foreign Application Priority Data

Jul. 11, 1994 [JP] Japan ................................ 6-158375

[51] Int. Cl.[6] .............................................. G06F 17/00
[52] U.S. Cl. ............................................ 706/47; 364/130
[58] Field of Search ........................... 364/130; 382/159; 395/10, 11, 50, 51, 54, 61, 200.1, 203, 900, 905, 906, 907; 705/1, 3; 706/14, 47, 45

[56] References Cited

U.S. PATENT DOCUMENTS

| | | | |
|---|---|---|---|
| 3,484,746 | 12/1969 | Fralick et al. | 382/159 |
| 4,970,658 | 11/1990 | Durbin et al. | 395/11 X |
| 5,051,932 | 9/1991 | Inoue et al. | 395/10 X |
| 5,119,470 | 6/1992 | Highland et al. | 395/64 |
| 5,186,150 | 2/1993 | Sekine | 395/900 X |
| 5,202,954 | 4/1993 | Miyazawa et al. | 395/51 X |
| 5,249,257 | 9/1993 | Akahori et al. | 395/61 X |
| 5,251,285 | 10/1993 | Inoue et al. | 395/10 |
| 5,350,912 | 9/1994 | Ishida | 250/202 |
| 5,367,619 | 11/1994 | Dipaolo et al. | 395/50 X |
| 5,377,308 | 12/1994 | Inoue et al. | 395/61 |
| 5,410,613 | 4/1995 | Suzuki | 382/159 |
| 5,487,130 | 1/1996 | Ichimori et al. | 395/3 |
| 5,557,521 | 9/1996 | Danz et al. | 701/57 |
| 5,673,365 | 9/1997 | Basehore et al. | 395/3 |
| 5,719,999 | 2/1998 | Nishidai et al. | 706/3 |

OTHER PUBLICATIONS

Journal of Japan Society for Fuzzy Theory and Systems, vol. 5., No. 1, pp. 116–128, 1993, "Behavior–Decision Fuzzy Algorithm with the Ambiguous State Adaptability for Autonomous Mobile Robots".

*Primary Examiner*—Edward R. Cosimano
*Attorney, Agent, or Firm*—Fay Sharpe Beall Fagan Minnich & McKee

[57] ABSTRACT

When an intention is decided by a computer, the conclusion part of a rule is expressed by using an intention level such as an auxiliary verb of intention and an intention is decided on the basis of the expression. A rule for a certain action is described in a format of "IF (status of A), THEN (action B on the basis of the status A)+(intention level)" beforehand. A fitness degree indicating the fitness state of the status A to the status to be processed is calculated. When the fitness degree at the strongest intention level is highest, the corresponding rule is assumed as an intention in the status to be processed. When the fitness degree at the strongest intention level is not highest, it is converted to a fitness degree equivalent to the intention level of the next strength and a rule which is an intention to an action is decided.

7 Claims, 14 Drawing Sheets

DECISION MAKING METHOD

BACKGROUND OF THE INVENTION

The present invention relates to a decision making method for deciding an action. More particularly, it relates to autonomous control for motion of an object (vehicle) such as a robot, an automobile, a space craft, or others. It also relates to decision of an action to be conducted from analysis and analytical results of information obtained from a public opinion survey and others. Furthermore, it relates to support of decision making of an action of a human.

DETAILED DESCRIPTION OF THE INVENTION

[Industrial Field of Application]

The present invention relates to a method for autonomously deciding an action of a vehicle such as a robot, an automobile, a space craft, or others, a method for supporting result analysis of an intention by a public opinion survey and decision making of an action of a human, and an apparatus for realizing them.

[Prior Art]

An art for autonomously deciding an action of a vehicle as well as a robot on the basis of "humanlike" judgment has been proposed. For example, in Journal of Japan Society for Fuzzy Theory and Systems, Vol. 5, No. 1, pp 116 to 128, 1993, "Behavior-Decision Fuzzy Algorithm with the Ambiguous State Adaptability for Autonomous Mobile Robots", the following method is proposed.

A proper strategy is selected from "safety", "economy", and "min-time" by fuzzy evaluation and the fuzzy rule, the algorithm, the parameter, and the threshold for deciding an action are tuned according to the strategy. The ambiguous state such as "passable" and "avoidable" is recognized on the basis of the sensor information according to them, and the threshold of the fitness degree to the ambiguous state is processed, and the actions of "replan", "pass", "wait", and "avoid" are decided. In this case, the conclusion part of the inferring rule is expressed conclusively or imperatively like If A is K, then (you) take the action B:IF (status of A), THEN (conduct an action of B).

In another example, in a public opinion survey, for an inquiry of "What do you think of conduct of an action C?", there are generally many responses prepared such as "must conduct C", "should conduct C", "must not conduct C", and others, and responses are obtained from answerers for thousands of matters, and a rate of responses is calculated. In this case, responses are often divided into affirmative intentions and negative intentions and simple addition is performed for evaluation.

SUMMARY OF THE INVENTION

When a human decides the intention to an action, he may decide it imperatively. Actually however, he often decides the intention from a rule using an auxiliary verb of intention such as:

"You must not use an automobile because there is no parking lot"; "You had better go up the stairs for the sake of health."; or "When you sweat, you should take a bath."

However, for conventional decision making by a computer, the conclusion part of the rule is expressed imperatively or conclusively for processing.

The present invention introduces an intention level expressing the same concept as that of an auxiliary verb of intention. It will be described more concretely hereunder.

A rule for deciding an action is expressed in the following format:

IF (status of A),

THEN (conduct an action B)+(intention level (auxiliary verb of intention)

The fitness degree to a statement is calculated by the condition part (IF part) of the rule, and the fitness degree is taken as a weight to the conclusion part (THEN part), and when the weight of the conclusion part expressing the strongest intention is biggest compared with the weights of other conclusion parts, it is taken as the intention to the action and its weight, and when the weight of the conclusion part expressing the strongest intention is not biggest compared with the weights of other conclusion parts, the weight of the conclusion part expressing the strongest intention is converted to the weight equivalent to the intention of the next strength, and a new weight of the intention of this strength is calculated on the basis of the converted weight and the original weight of the aforementioned conclusion part expressing the next strength, and when the weight is biggest compared with the weights of other conclusion parts, it is taken as the intention to the action and its weight, and when the new weight is not biggest compared with the weights of other conclusion parts, the aforementioned processing is repeated in the order of strength of intention until the intention to the action is decided. By doing this, the intention to the action is decided.

In this case, when the intention level is expressed by an auxiliary verb of intention, the aforementioned method can be understood easily.

When there are a plurality of actions to which the intentions are decided by the aforementioned method, each action is classified per its attribute, and a representative action, an intention to the action, and its weight are decided per each attribute, and whether the representative actions decided per each attribute can be conducted simultaneously is decided, and when all the representative actions can be conducted simultaneously, all the actions, intentions, and weights are decided as a final intention, and when there exists a combination of actions which cannot be conducted simultaneously, the preferential action among the combination of actions, the intention to the action, and its weight are selected, and another representative action, its intention, and the weight of the intention are decided anew for the attribute of the action not selected preferentially, and whether the representative actions can be conducted simultaneously is decided again, and this processing is repeated until the intention to the final action can be decided, and intentions to a plurality of actions are decided.

When a rule of an expression using an auxiliary verb of intention is processed by a computer, a strong intention can be assigned to a rule which is given high priority for autonomously operating a vehicle. For example, an action described in a rule relating to safety can be executed preferentially. By displaying an intention and its weight graphically, the judgment for decision of an action of a human can be supported. Furthermore, for automatic dealing of stocks, a rule for dealing can be decided by a client by using an auxiliary verb of intention.

DESCRIPTION OF THE PREFERRED EMBODIMENTS

Figure 1:
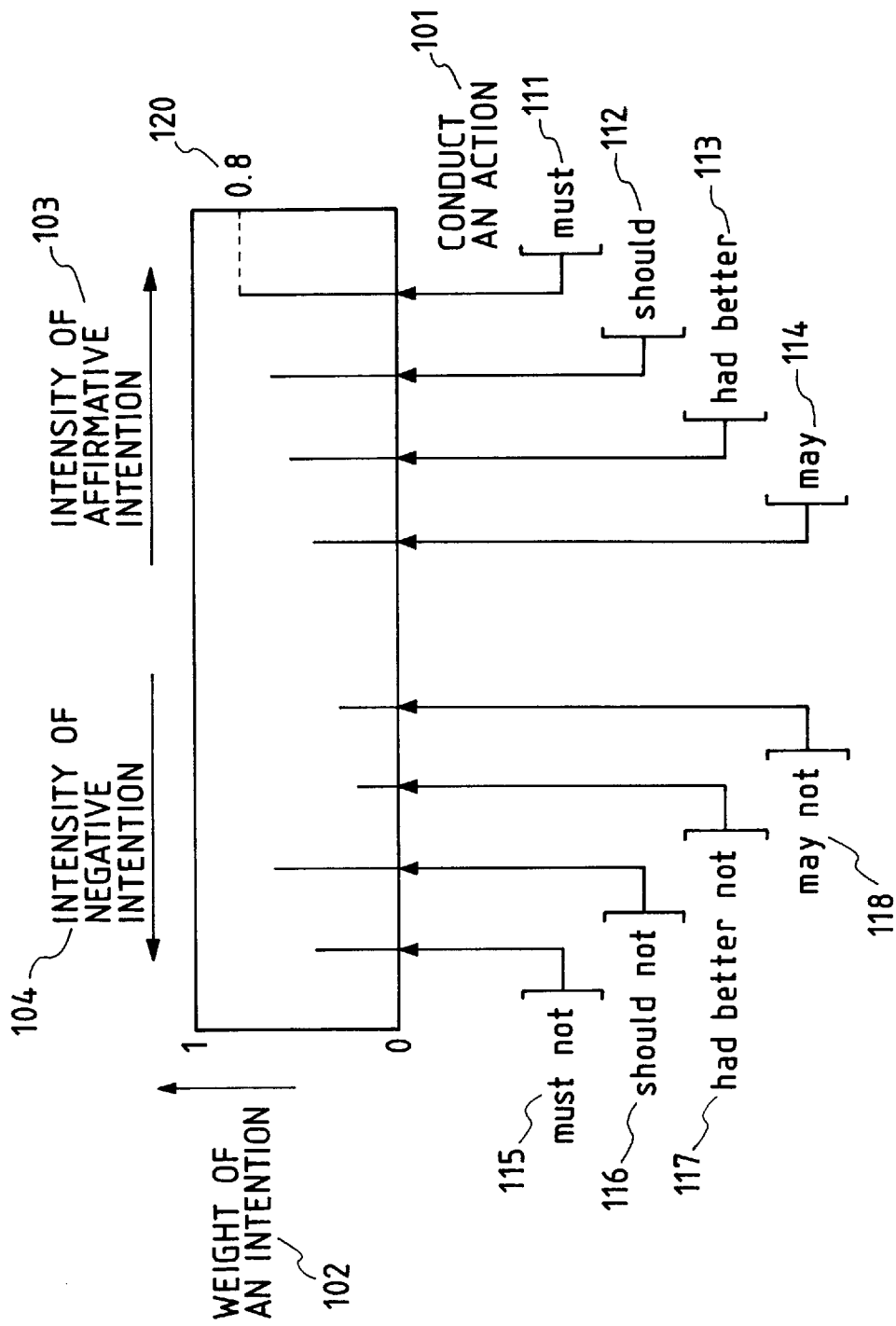
FIG. 1 is a drawing illustrating the conclusion part of a rule for decision making which is a characteristic of the present invention.

FIG. 1 is a drawing illustrating the conclusion part of a rule for decision making of the present invention.

The axis of abscissa in the drawing indicates an intention to conducting an action (101) at several steps (111) to (118). The axis of ordinate indicates the weight of each intention (102). In the present invention, an auxiliary verb of intention is used as an expression of an intention to an action. In the drawing, expressions of eight auxiliary verbs of intention are used as shown below.

must (111)

should (112)

had better (113)

may (114)

must not (115)

should not (116)

had better not (117)

may not (118)

(111) to (114) indicate affirmative intentions and must indicates a strongest intention (103). (115) to (118) indicate negative intentions and must not indicates a strongest intention (104).

A rule for decision making will be explained hereunder. The expression format of a rule is as follows:

IF (status of A),

THEN (conduct an action B)+(intention level (auxiliary verb of intention))

For example, it is an expression such that "If it is raining, then you must put on an umbrella." In this case, when the fitness degree to the statement that "it is raining" is set to 0.8 by any subjective judgment, the weight of an intention that an action of "put on an umbrella" must be conducted is regarded as 0.8 (120).

In this case, the value of the fitness degree is made equal to the value of the weight. However, they may not be equal to each other. It is desirable that there exists a relationship between the fitness degree and the weight. For example, a value obtained by adding or subtracting the predetermined value to or from the fitness degree is the weight. Or, the fitness degree and the weight may be in proportion to each other.

Figure 2:
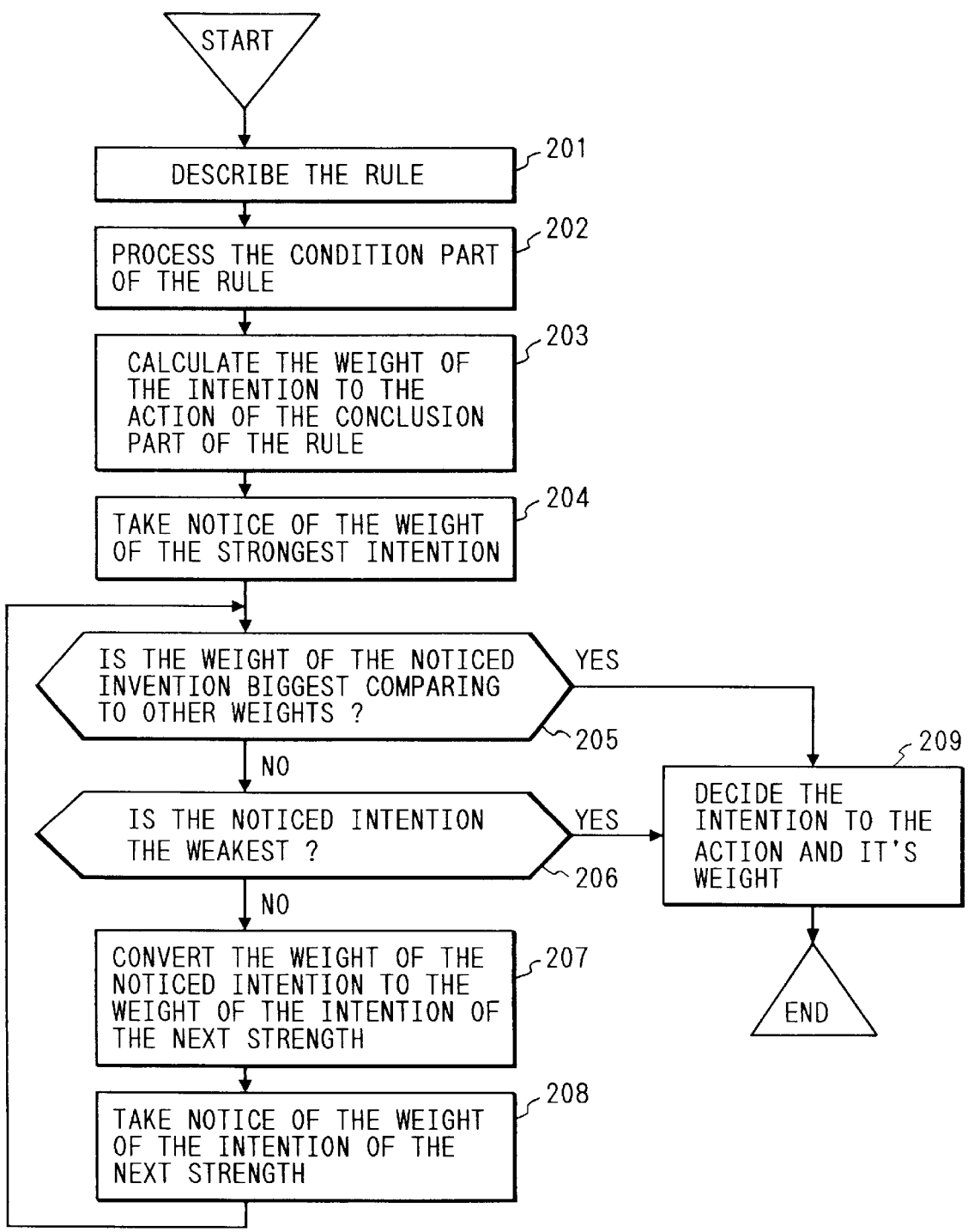
FIG. 2 is a drawing illustrating the procedure for decision making of the present invention.

FIG. 2 is a drawing illustrating the procedure for decision making of the present invention.

Firstly, the rule for an action is described (201). For example, for an action of "put on an umbrella", there are the following rules available:

"If it is raining, you must put on an umbrella."

"If a strong wind is blowing, you should not put on an umbrella (for safety)."

"If the sun is fierce, you had better put on an umbrella."

"If the weather is normal, you may not put on an umbrella."

Next, the fitness degree to a certain statement described in the condition part of the rule is calculated on the basis of the subjective judgment (202) and the weight of the intention to the action of the conclusion part is obtained (203). The intention to the action is decided from the weight of each intention (209).

As a certain statement mentioned above, the present statement may be cited. When a simulation is conducted, the simulated statement also may be cited.

A method for deciding an intention to an action will be described hereunder (204 to 208).

(1) After noticing the weight of the strongest invention (204), then when the weight of the strongest intention is biggest compared with all other weights, it is decided as an intention (205, 209). On the other hand, if it is the weakest (206), then it can also be decided (209).

(2) When the weight of the strongest intention is not biggest compared with all other weights, the weight of this intention is converted to the weight of the intention of the next strength (205, 207).

In this case, for example, the weight X of the intention level L is converted to the weight 1-M/L (1-X) of the intention level M. When a weight Y exists in the intention level M originally, max (Y, 1-M/L (1-X) is set as a new weight of the intention level M.

(3) When the weight of the intention of the next strength is biggest compared with all other weights, it is decided as an intention (208, 205, 209).

(4) The above processing is repeated in the order of strength of intention until the intention to the action is decided.

An actual example of the aforementioned processing (2) will be described below.

It is assumed that the intention level is must: 4, should: 3. Now, the weight of an intention of "you must put on an umbrella" is 0.4 and the weight of an intention of "you should put on an umbrella" is 0.6. In this case, when the weight of the intention of "must" is converted as a weight of the intention of "should" by the aforementioned formula, the value is 0.55. Since the bigger weight is used, the weight of the intention of "should" is left at the original value of 0.6 after all.

For the aforementioned processing (2), another method may be used. For example: (2') A new weight of the intention level M is obtained from a formula of W=Y+(1-M/L) X by using the weight X of the intention level L and the original weight Y of the intention level M. When W exceeds 1, it is assumed as W=1.

An actual example of the aforementioned processing (2') will be described below.

As in the aforementioned example, the weight of an intention of "you must put on an umbrella" is 0.4 and the weight of an intention of "you should put on an umbrella" is 0.6. In this case, a new weight of the intention of "should" is 0.7 from the weight of the intention of "must" and the weight of the intention of "should".

An actual example for decision making will be explained hereunder using the aforementioned method (2).

Figure 3:
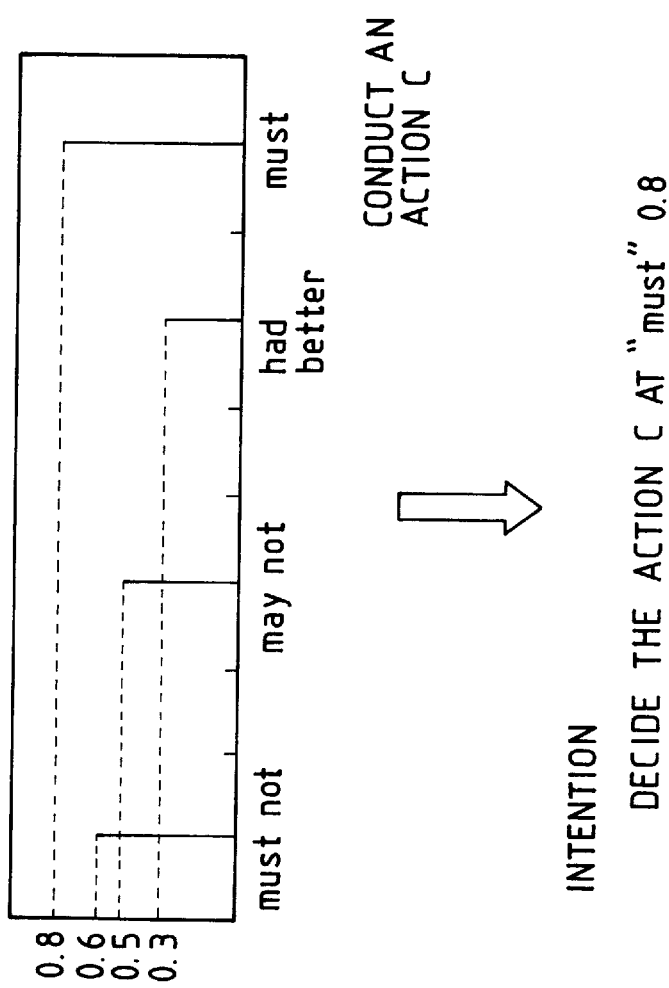
FIG. 3 is a drawing showing a processing example for obtaining the weight of an intention.

FIG. 3 is a drawing when the weight of each intention is obtained by the processing of the condition part of a rule for "conduct an action C". in this example, between the weight (0.8) of "must" and the weight (0.6) of "must not" at the strongest level, the weight of "must" is bigger. Therefore, an intention to an action of "must conduct an action C" at the weight of 0.8 is decided.

Figure 4:
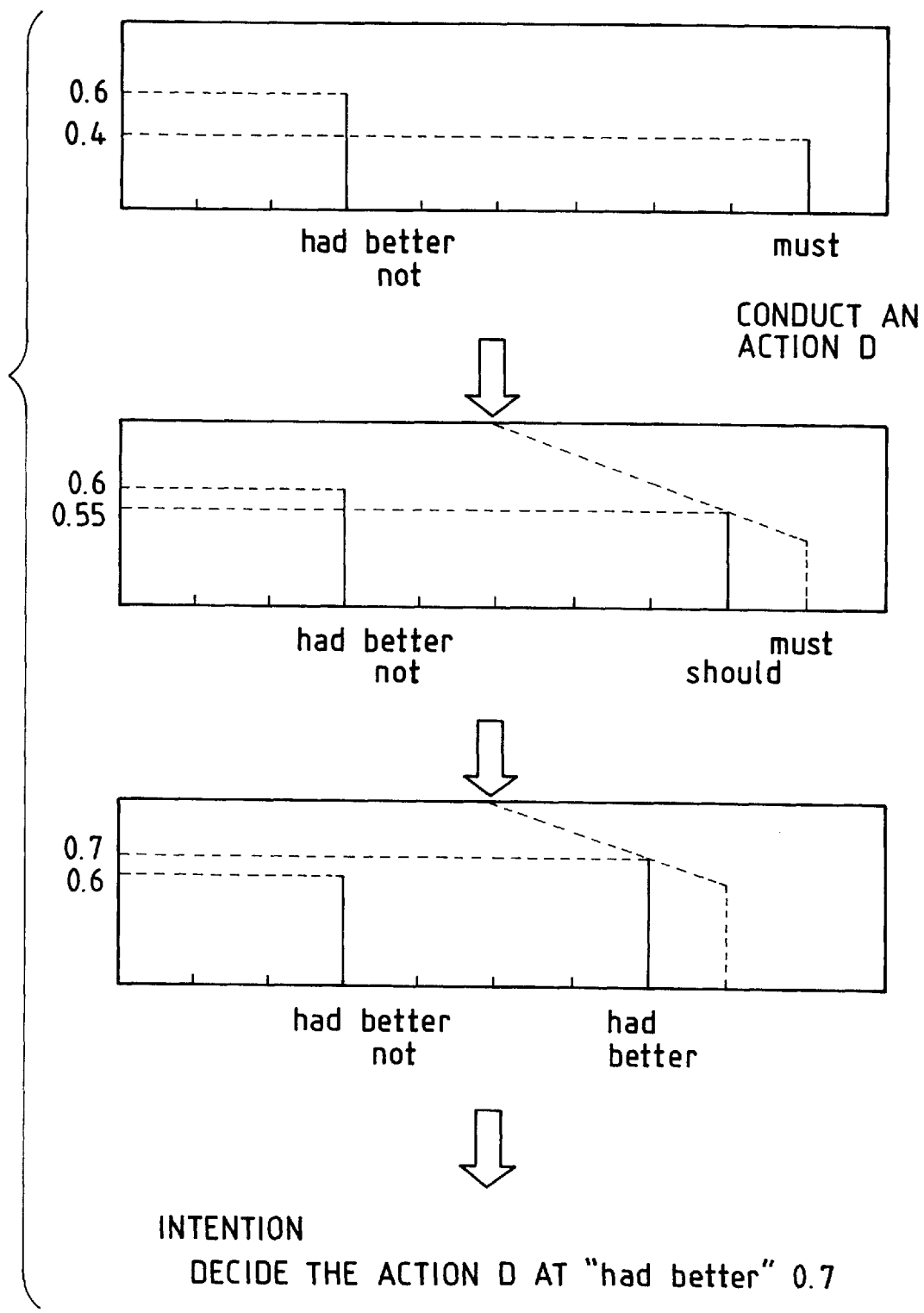
FIG. 4 is a drawing showing a processing example for obtaining the weight of an intention.

FIG. 4 is a drawing when the weight of each intention is obtained by the processing of the condition part of a rule for "conduct an action D". In this example, the weight (0.4) of "must" at the strongest level is not biggest compared with other weights, so that it is converted to a weight of "should". However, this weight (0.55) is neither biggest compared with other weights, so that it is converted to a weight of "had better" further. In this case, at the next level, the two weights of affirmative "had better" and negative "had better not" are compared. Since the weight (0.7) of "had better" is biggest compared with other weights, an intention to an action of "had better conduct an action D" is decided at a weight of 0.7.

The decision making for an action is explained above. Decision making for a plurality of actions will be explained hereunder.

In the following example, "run", "walk", "stop", "wave a hand", and "fold arms" will be considered as a plurality of actions. In this case, the actions of "run", "walk", and "stop" are the same attribute relating to operations of legs. The actions of "wave a hand" and "fold arms" are the same attribute relating to operations of hands. For actions of the same attribute, it is necessary to select a representative action. The action of "wave a hand" can be executed simultaneously with all actions relating to operations of legs but the action of "fold arms" can be executed simultaneously only with the action of "stop" relating to an operation of legs.

Figure 5:
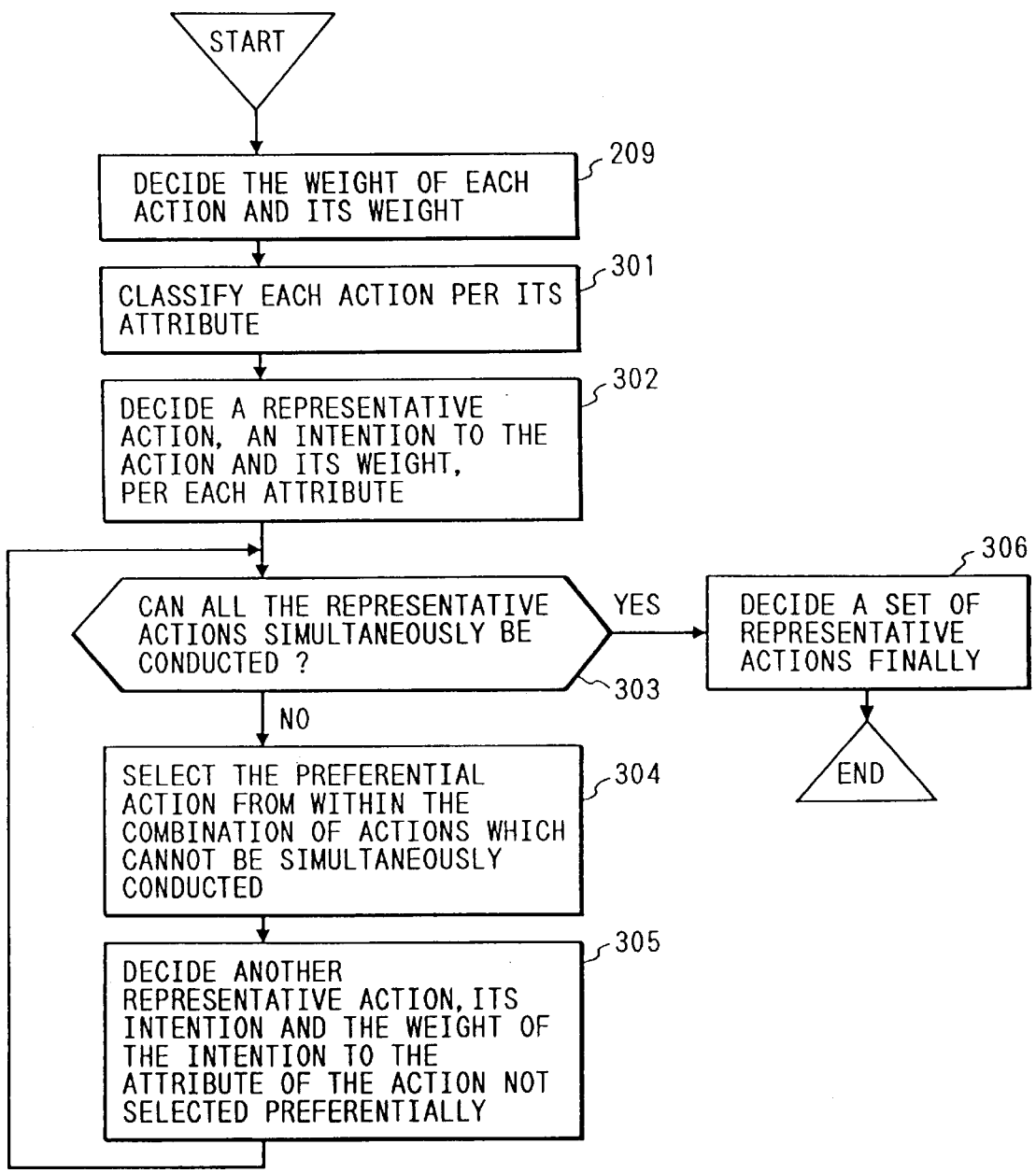
FIG. 5 is a drawing illustrating the procedure for decision making for a plurality of actions of the present invention.

FIG. 5 is a drawing illustrating the procedure for decision making for a plurality of actions of the present invention. It is assumed that the decision making step (209) for each action has been executed already.

Firstly, the plurality of actions are classified per each attribute (301). For example, the actions of "run", "walk", and "stop" are classified to the attribute of operation of legs and the actions of "wave a hand" and "fold arms" are classified to the attribute of operation of hands. Next, a representative action is decided per each attribute (302), and Steps 303 to 305 are repeated until all the representative actions can be conducted simultaneously, and the intention to the final action is decided (306). If all the actions cannot be simultaneously conducted, then one is selected (304), another is decided upon (305) in its place, and then the new combination is again considered.

Figure 6:
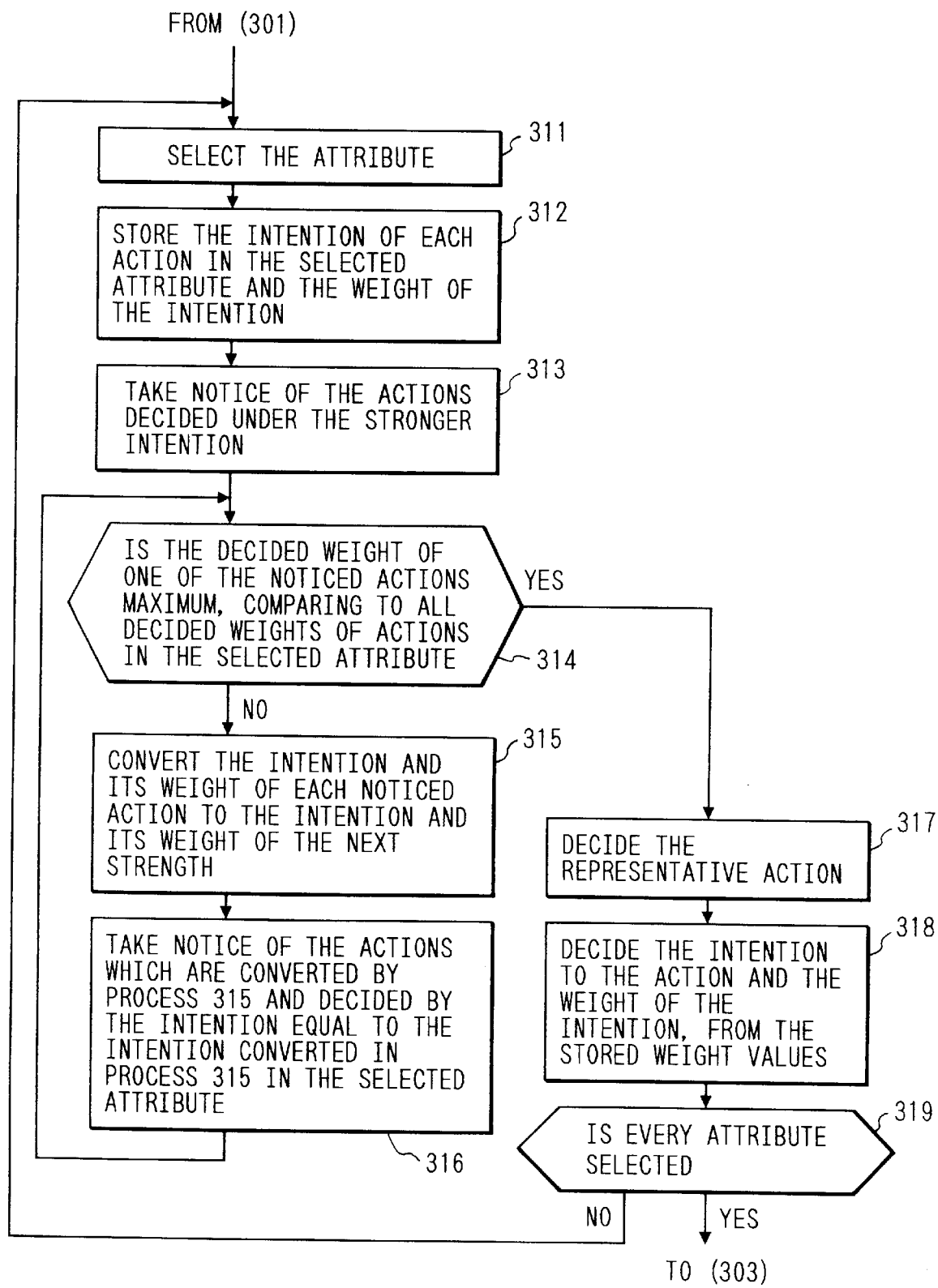
FIG. 6 is a drawing illustrating the procedure for deciding a representative action per each attribute.

FIG. 6 is a drawing illustrating the procedure for deciding a representative action per each attribute (302).

Firstly, the attribute is selected (311) and the intention of each action in the selected attribute and the weight of the intention are stored (312). Next, the actions decided under the stronger intention are noticed (313). When the decided weight of one of the noticed actions is maximum compared with all decided weights of actions in the selected attribute (314), the action is decided as a representative one (317) and the intention of the representative action and its weight are decided (318) from those stored at Step 312. When all the decided weights of the noticed actions are not maximum compared with all decided weights of actions in the selected attribute, the intention and its weight of each noticed action are converted to the intention and its weight of the next strength (315) and the actions which are converted at Step 315 and decided by the intention equal to the intention converted at Step 315 in the selected attribute are noticed (316). Steps 314 to 316 are repeated until the representative action can be decided. The above steps are executed for all the attributes (319) by either returning to Step 311 or selecting preferential actions by the Steps of FIG. 7.

For example, assuming that the intention to the action in the attribute relating to operation of legs and its weight are as shown below:

"run": must: 0.2,
"walk": should: 0.6, and
"stop": may: 0.1, the action decided under the strongest intention ("must" in this example) is only "run". However, the weight of this intention is not maximum such as 0.2, so that it is converted to a weight of "should". When it is converted by one of the aforementioned procedures, the converted weight is 0.4. Next, when the weights of the action "walk" decided by "should" and the action "run" converted to "should" are examined, the weight of "walk" is maximum such as 0.6. Therefore, the representative action, the intention to the action, and its weight are as follows:

"walk": should: 0.6

On the other hand, assuming that the above example is as shown below:

"run": must: 0.2,
"walk": should: 0.3, and
"stop": may: 0.1, when the weight 0.3 of the action "walk" decided by "should" and the weight 0.4 of the action "run" converted to "should" are examined, the weight of "run" is maximum such as 0.4 and the representative action is "run". The intention and weight in this case are as shown below:

"run": must: 0.2

Figure 7:
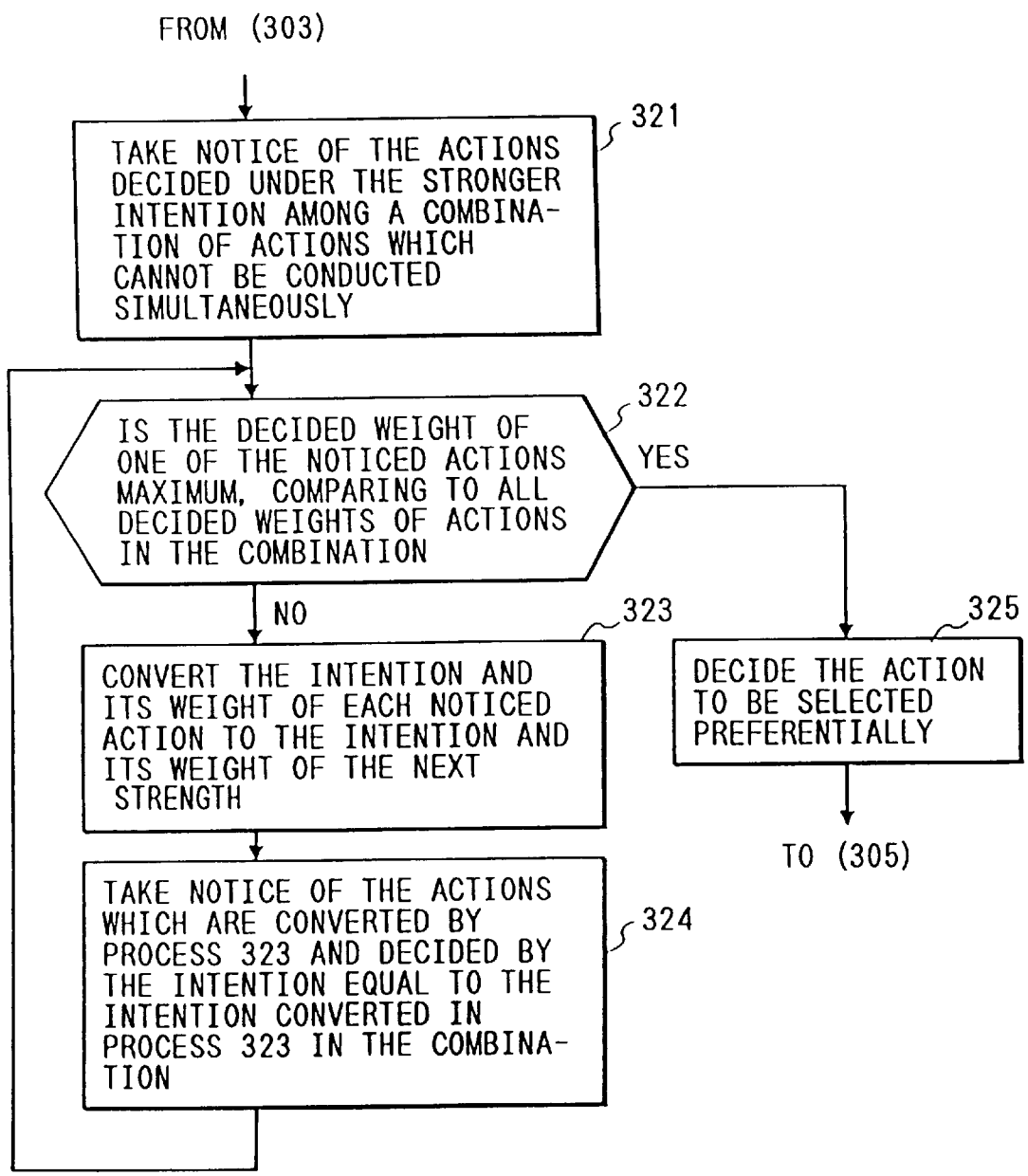
FIG. 7 is a drawing illustrating the procedure for selecting a preferential action among a combination of actions which cannot be conducted simultaneously.

FIG. 7 is a drawing illustrating the procedure for selecting a preferential action among a combination of actions which cannot be conducted simultaneously (304).

Firstly, the actions decided under the stronger intention among a combination of actions which cannot be conducted simultaneously are noticed (321). When the decided weight of one of the noticed actions is maximum compared with all decided weights of actions in the combination, the action is decided as a preferential one (325). When all the decided weights of the noticed actions are not maximum compared with all decided weights of actions in the combination, the intention and its weight of each noticed action are converted to the intention and its weight of the next strength (323) and the actions which are converted at Step 323 and decided by the intention equal to the intention converted at Step 323 in the combination are noticed (324). Steps 322 to 324 are repeated until the preferential action can be decided.

To decide another representative action, an intention to the action, and its weight for the attribute of an action which is not selected preferentially, the action which is not selected preferentially is excluded and Step 302 is executed.

An actual example of decision making for a plurality of actions will be explained hereunder. It is assumed that the intention to each action and its weight are as shown below.

"run": must: 0.3,
"walk": should: 0.2,
"stop": should: 0.1,
"wave a hand": must not: 0.1, and
"fold arms": should: 0.5

In this case, the action representing the attribute relating to operation of legs and operation of hands, the intention to the action, and its weight are decided as shown below at Step 302.

"run": must: 0.3
"fold arms": should: 0.5

The actions of "run" and "fold arms" cannot be conducted simultaneously. When Step 304 is executed, the preferential action is "fold arms". Therefore, when another action representing the attribute relating to operation of legs is decided at Step 305, the following are decided:

"run": should: 0.2
"fold arms": should: 0.5

These actions can be neither conducted simultaneously. Therefore, when Step 305 is executed, the following are decided.

"stop": should: 0.1
"fold arms": should: 0.5

This combination can be conducted simultaneously, so that they are the intention to the action which is decided finally (306).

In the above explanation, the level of intention is fixed (4 for "must" and 3 for "should"). However, they may be variable ("must" is adjusted to 3.8 and "should" to 3.1). (A) to (D) shown below will be explained as an actual application example of the method explained above.

(A) Autonomous action decision in rendezvous and docking of a space-craft
(B) Result analysis of public opinion survey
(C) Driver support in car navigation
(D) Automatic dealing of stocks (A) Autonomous action decision in rendezvous and docking of a space-craft For construction and servicing of a space station, a transport system going and returning between the ground and the space station is necessary. As a transport system, operating by a pilot, remote teleoperating by a ground operator, and autonomous operating by an onboard computer can be considered. Particularly in consideration of an operation cost and communication delay, autonomous operating is effective. To perform the autonomous operating, an art of decision making by an onboard computer is necessary.

Figure 8:
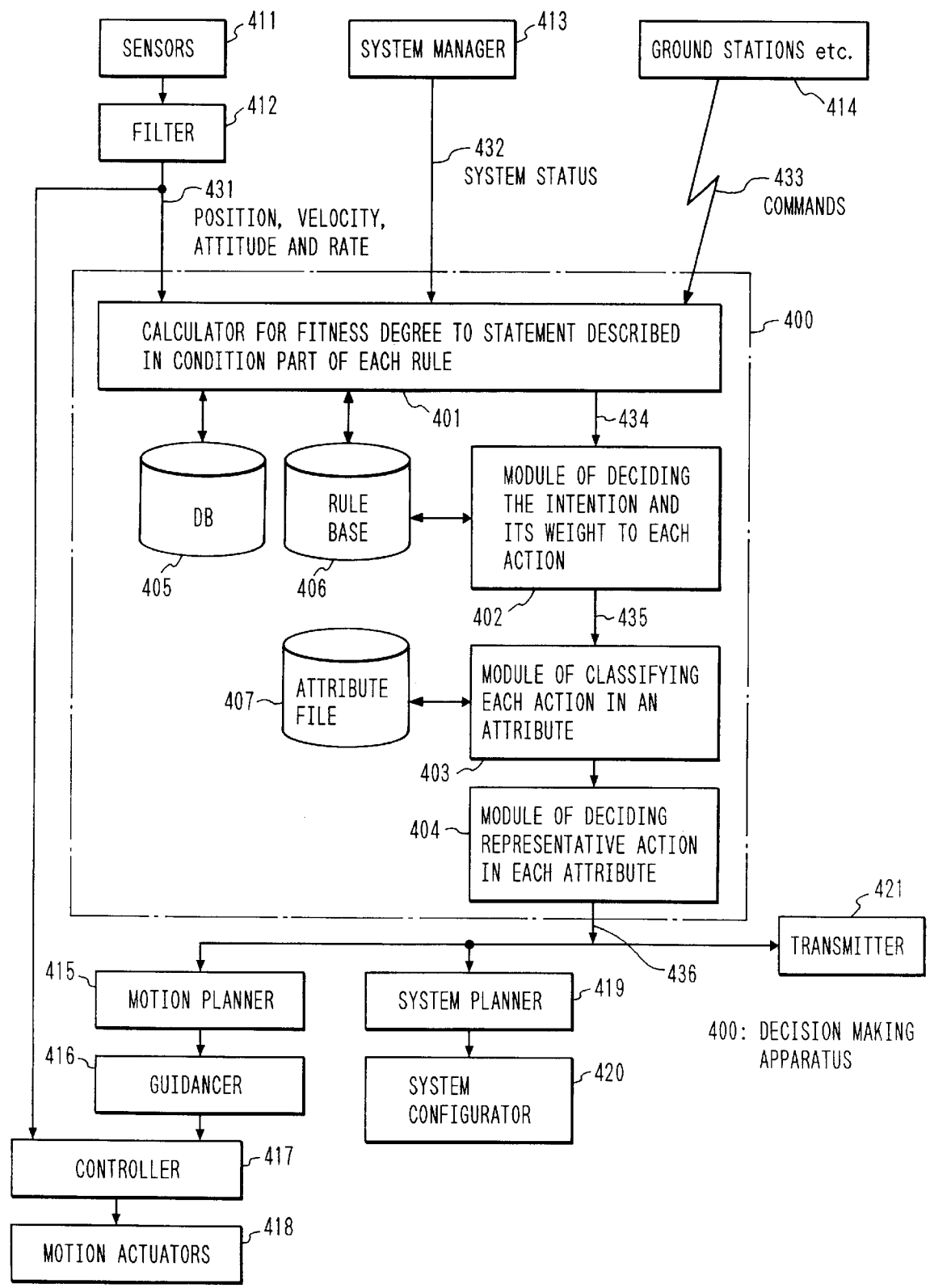
FIG. 8 is a system architecture diagram for autonomously operating a space-craft.

FIG. 8 is a system architecture diagram for autonomously operating a space-craft.

The position, velocity, attitude, and rate (431) by sensors (411) and a filter (412), the system status (432) by a system manager (413), and commands (433) by communication from ground stations, etc. (414) are inputted to a decision making apparatus (400).

In a rule base (406) of the decision making apparatus, many rules are described in an expression format of:

IF (status of A), THEN (conduct an action B)+(auxiliary verb of intention)

In a DB (405), the data for calculating the fitness degree to a certain statement is stored on the basis of the position, velocity, attitude, and rate (431), the system status (432), and the communication commands (433). In an attribute file (407), the attribute of each action is stored. A calculator for fitness degree to a statement described in the condition part of each rule (401) calculates the fitness degree (434) to the statement described in the condition part of the rule with reference to the rule described in the rule base and the data stored in the DB on the basis of the position, velocity, attitude, and rate (433), the system status (432), and the communication commands (431). A module of deciding the intention and its weight to each action (402) obtains the weight of the intention described in the condition part of the rule with reference to the rule described in the rule base for each action and obtains the intention to each action and its weight (435). A module of classifying each action in an attribute (403) assigns an attribute to each action with reference to the attribute information in the attribute file. A module of deciding representative action in each attribute (404) decides a representative action per each attribute and decides an action to be conducted finally.

The decision making apparatus outputs (436) the aforementioned action to be decided and conducted finally to a motion planner (415), a system planner (419), and a transmitter 421.

The motion planner (415) lays a concrete motion plan on the basis of the action having the attribute relating to motion and a guidancer (416) calculates the target values of position, velocity, attitude, and rate on the basis of the motion plan. On the basis of the target values and the actual data (431), force and torque are given to a spacecraft by a controller (417) and motion actuators (418). The system planner (419) lays a concrete motion plan on the basis of the action having the attribute relating to the system and turns the system on or off by a system configurator (420).

The transmitter (421) transmits the final action decided by the decision making apparatus (400), the intention to the action, and its weight to the ground stations, etc.

Figure 9:
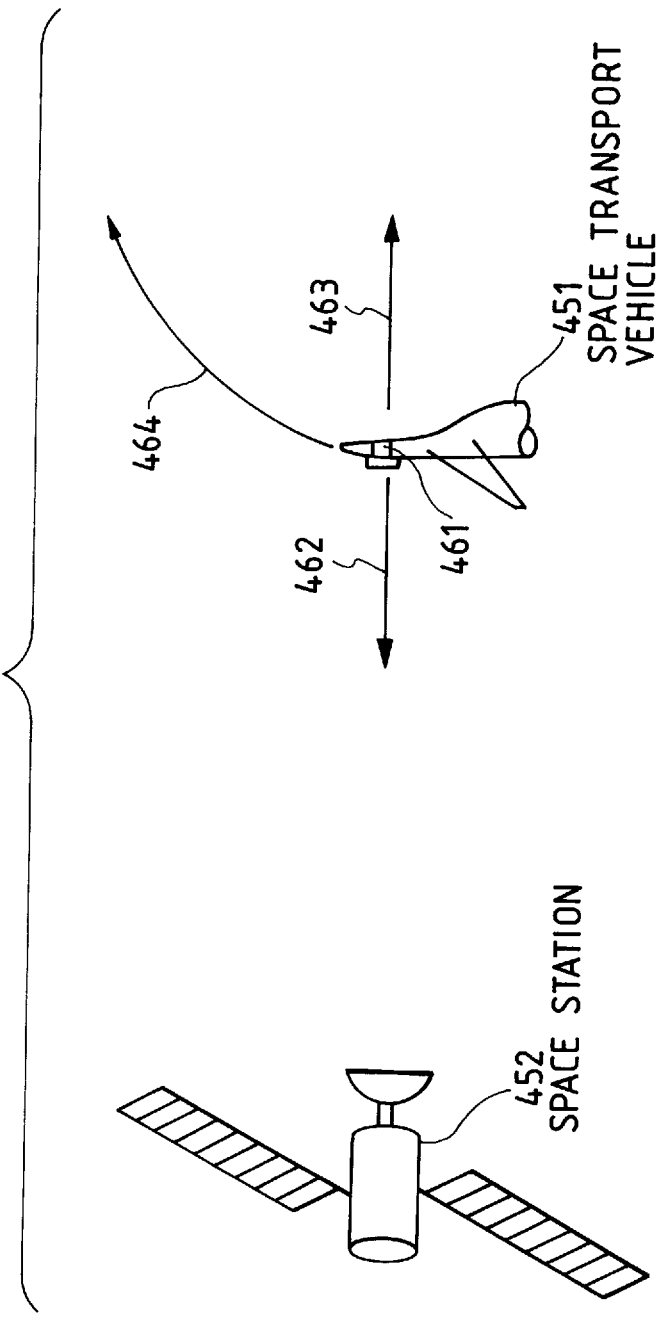
FIG. 9 is a drawing illustrating an action having the attribute relating to the motion at the final phase of rendezvous and docking of a space-craft.

FIG. 9 is a drawing illustrating an action having the attribute relating to the motion at the final phase of rendezvous and docking of a space-craft.

In a space transport vehicle (451), materials to be used in a space station (452) are loaded. The two space-crafts are joined together and the materials are supplied. Actions having the attribute relating to the motion of a space transport vehicle are "relative station-keeping (461)" for keeping the distance between space-crafts constant, "relative approach (462)" for approaching a space station in a straight line, "relative back away (463)" for parting from the space station in a straight line, and "abort (464)" for averting to another orbit. Decision making for these actions is executed by the decision making apparatus (400) loaded in the space transport vehicle (451).

An actual example of decision making will be explained hereunder.

In the rule base (406), for example, many rules such as those indicated below are stored.

IF (all devices are in normal operation),
THEN (relative approach) (may);
IF (fuel is insufficient),
THEN (abort) (must)
IF (flight is not on schedule),
THEN (relative station-keeping) (had better)
IF (distance is short),
THEN (be on rendezvous sensor) (must)
IF (thrust power is down)
THEN (switch fuel system) (should)

Figure 10:
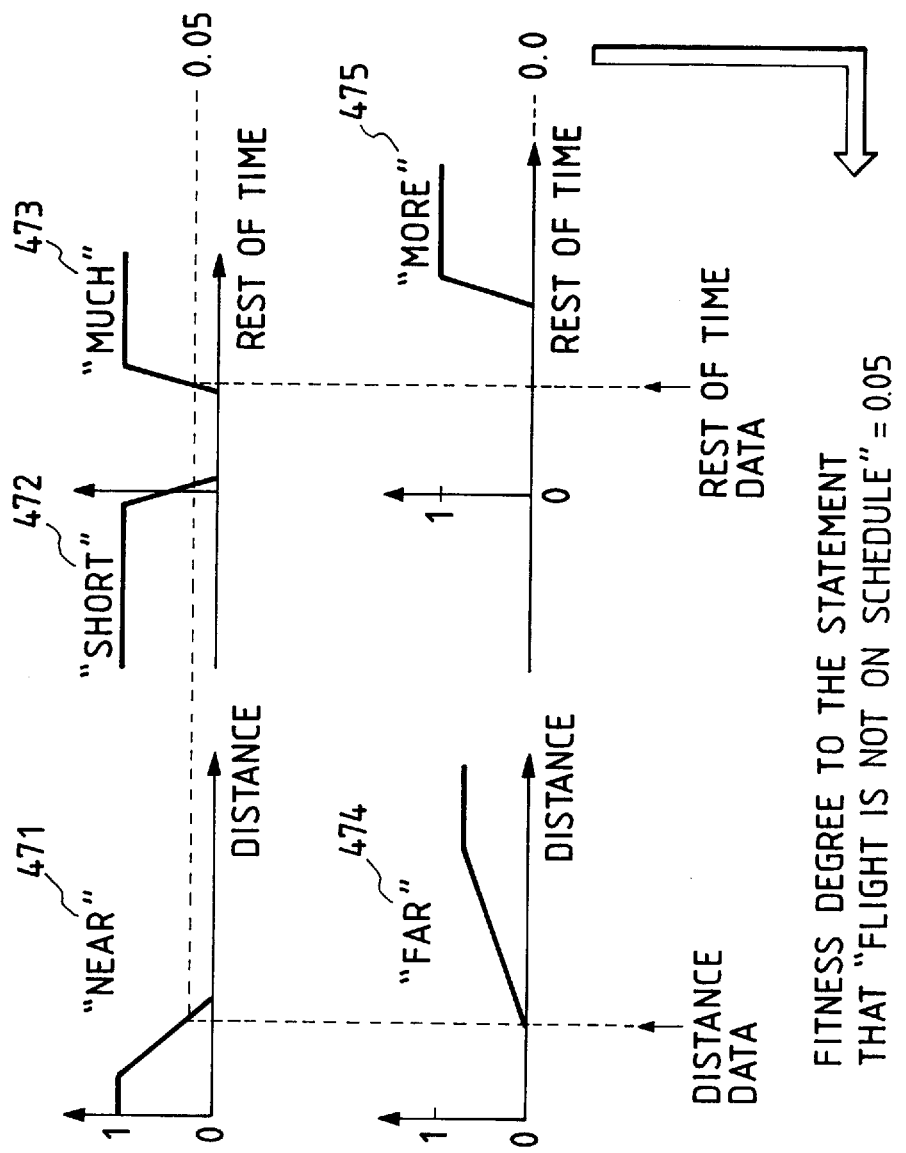
FIG. 10 is a drawing showing a calculation example of the fitness degree to the statement.

In the DB (405), for example, to calculate the fitness degree to the statement of "flight is not on schedule", the data of a membership function (from 471 to 475) as shown in FIG. 10 is stored.

In the attribute file (407), for example, the attribute of motion is stored for "relative approach" and "relative station-keeping", etc. and the attribute of rendezvous sensor operation is stored for "be on rendezvous sensor, etc."

The calculator for fitness degree to statement described in condition part of each rule (401) calculates the distance and rest of time from the position, velocity, attitude, and rate (431) with reference to the condition part of the rule of, for example:

IF (flight is not on schedule),
THEN (relative station-keeping) (had better)

stored in the rule base and the data stored in the DB as shown in FIG. 10 and calculates the fitness degree (0.05) to the statement of "flight is not on schedule" from the fuzzy inference. The module of deciding the intention and its weight to each action (402) concludes as follows:

"relative station-keeping": had better: 0.5

The aforementioned processing is executed for all the corresponding rules and the intention to the final action is determined per each attribute. As a result, the decision making is executed, for example, as shown below.

Motion attribute: "abort": must: 0.8, and
Rendezvous sensor operation attribute: "be on rendezvous sensor": must: 1.0.

In this case, when the action of motion of the space vehicle is not "abort", the motion planner (415) plans when and where the abort is to be started. When the rendezvous sensor is not in operation, the system planner (419) issues an instruction for turning the operation switch on.

As mentioned above, a designer of autonomous operating of a space-craft can express a rule for decision making of an action by using an auxiliary verb of intention and when the weight of a rule having a strong intention is big, the rule is executed preferentially. Therefore, when the intention of a rule for safety is made strong, an action of safety priority can be conducted easily.

When motion data of a space-craft is calculated every predetermined time and the intention is decided as mentioned above every predetermined time, the space-craft can be controlled more accurately.

(B) Result analysis of public opinion survey

Mass-media such as television and newspapers often take a public opinion survey so as to survey public opinion. The public opinion survey is an effective means for checking the trend. As a public opinion survey, a survey by a house-to-house visit, a survey by a mailing means, and a survey by phoning can be considered. Particularly in consideration of quick responses and a sense of participation, a telephone survey by a live telecast is effective. To take this survey in real time, an art of result analysis of a public opinion survey by a computer is necessary.

Figure 11:
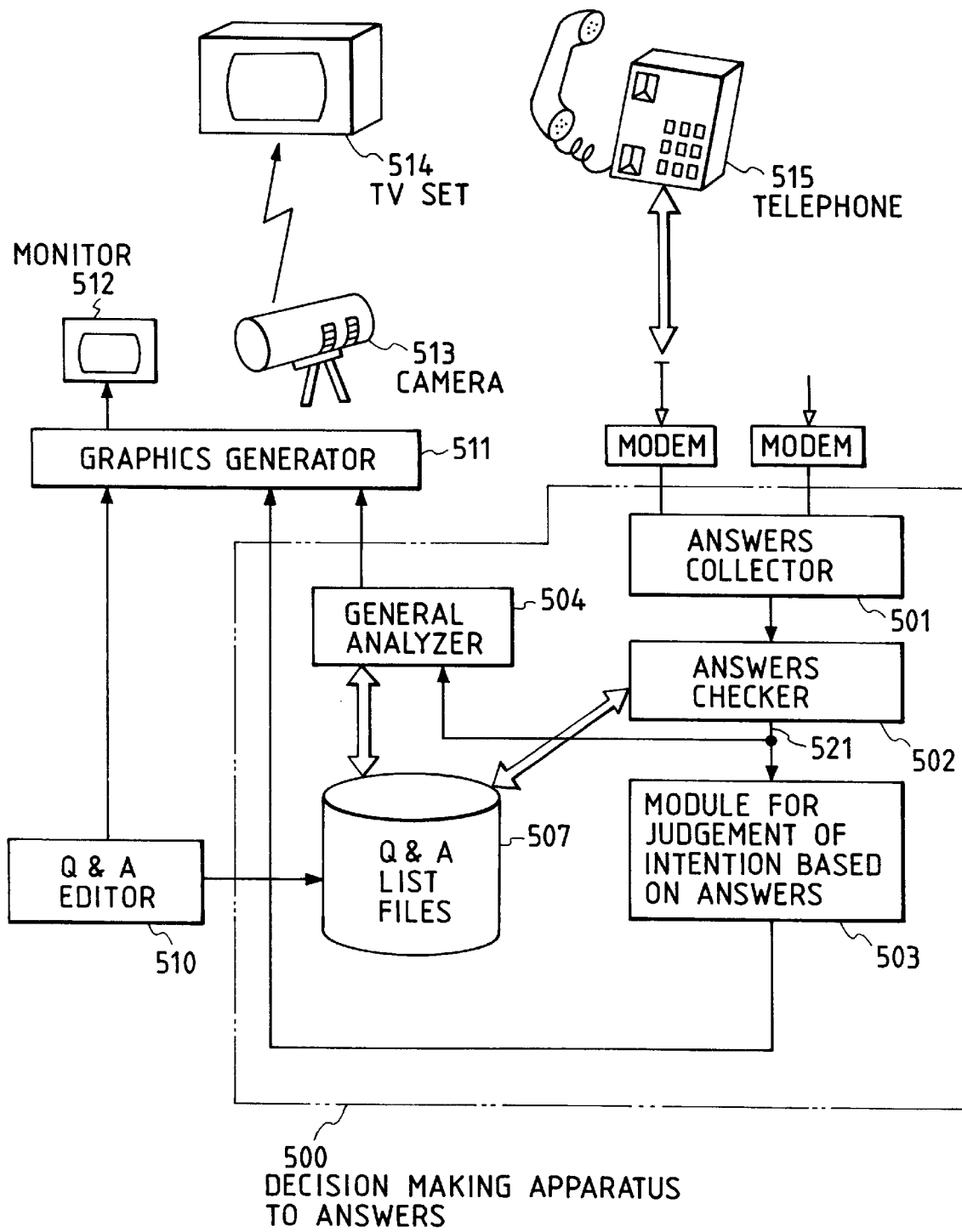
FIG. 11 is a system architecture diagram for taking a public opinion survey.

FIG. 11 is a system architecture diagram for taking a public opinion survey.

An operator for taking a public opinion survey by an mass-medium operates a computer terminal, generates questions and answers, generates an answer group in which an auxiliary verb of intention is assigned to each answer and an answering method by a Q&A editor (510), and sends the questions, the answer group, and the answering method to a graphics generator 511. The graphics generator generates graphics of the questions, the answers, and the answering method, displays their graphics on a monitor (512), photographs them by a camera (513), and displays them on a TV set (514) installed in each household. An answerer answers a question by telephone (515) by watching television. The Q&A editor (510) stores the relevance between a question and an answer group thereof in Q&A list files (507) of a decision making apparatus to answers (500).

An answers collector (501) of the decision making apparatus to answers (500) collects an answer from each answerer by telephone and an answers checker 502 calculates an indication rate (521) of intentions to answers. This function refers to the Q&A list files (507) and translates telephone answers from answerers to concrete questions and answer groups. A module for judgment of intention based on answers (503) regards the indication rate of intentions to answers as a weight by the decision making method of the present invention and decides an intention which is representative for each question.

An actual example of result analysis of a public opinion survey will be explained hereunder. It is assumed that telephone lines are connected already.

An operator generates, for example, a question of "What do you think of importation of A?" and two answers of "import with limitation" and "import without limitation". In this case, the Q&A editor (510) generates an answer group with an auxiliary verb of intention assigned as shown below as an answer group.

"should import with limitation" "should not import with limitation"
"had better import with limitation" "had better not import with limitations"
"should import without limitation" "should not import without limitation"
"had better import without limitation" "had better not import without limitation"

The Q&A editor (510) also generates an answering method of answerers. For example, the number of this question is assumed as #1, "import with limitation" as #1, "import without limitation" as #2, auxiliary verbs of intention as #4, #3, #2, and #1 in the order of affirmative intensity and as *4, *3, *2, and *1 in the order of negative intensity. The graphics generator (511) generates message graphics of an answering method for operating a telephone, for example, in the order of:

"question", "action", "auxiliary verb of intention", "end"

When an answerer wants to give, for example, an answer of "had better import with limitation" according to a message on the TV set, he operates the telephone as shown follows: "#1", "#1", "#2", "##"

A symbol "##" indicates an end.

The answers collector (501) collects answers for the question of "#1" as shown below:

For "#1" and "#4": 40 answers
For "#1" and "#3": 30 answers

The answers checker (502) obtains indication rates as shown below when the total number of answers for the question of "#1" is 120:

Indication rate for "#1" and "#4": 33%
Indication rate for "#1" and "#3": 25%

In this case, the answers checker (502) translates the following to the question of "What do you think of importation of A?" and the answer of "should import with limitation" with reference to the Q&A list files (507): "#1", "#1", "#3"

Assuming the answer indication rates, for example, as shown below:

"had better import with limitation": 30%,
"may import with limitation": 30%, and
"must not import with limitation": 40%, the module for judgment of intention based on answers (503) esteems the intention of "must not" which is an intention of highest intensity by the decision making method of the present invention and decides the intention to answers as follows:

"must not import with limitation": 40% and regards an opinion of "must not import with limitation" as a representative opinion. On the other hand, when opinions are divided and analyzed into affirmative opinions and negative opinions as conventional by a general analyzer (504), the affirmative opinions account for 60%, so that the general analyzer (504) analyzes that "import with limitation" is agreed to. These results are graphed and televised by the graphics generator (511).

When the decision making method of the present invention is incorporated into the conventional public opinion survey method and apparatus therefor in this manner, result analysis of a public opinion survey for a question taken from another viewpoint can be made.

(C) Driver support in car navigation

A navigation system for an automobile is a system for displaying the position of the automobile on a map. In some of navigation systems, a guidance function for guiding a driver to selection of a road and a service function for offering specific information are mounted. Particularly a driver who is driving an automobile cannot read detailed information, so that the guidance function for supporting driving by a driver is effective.

Figure 12:
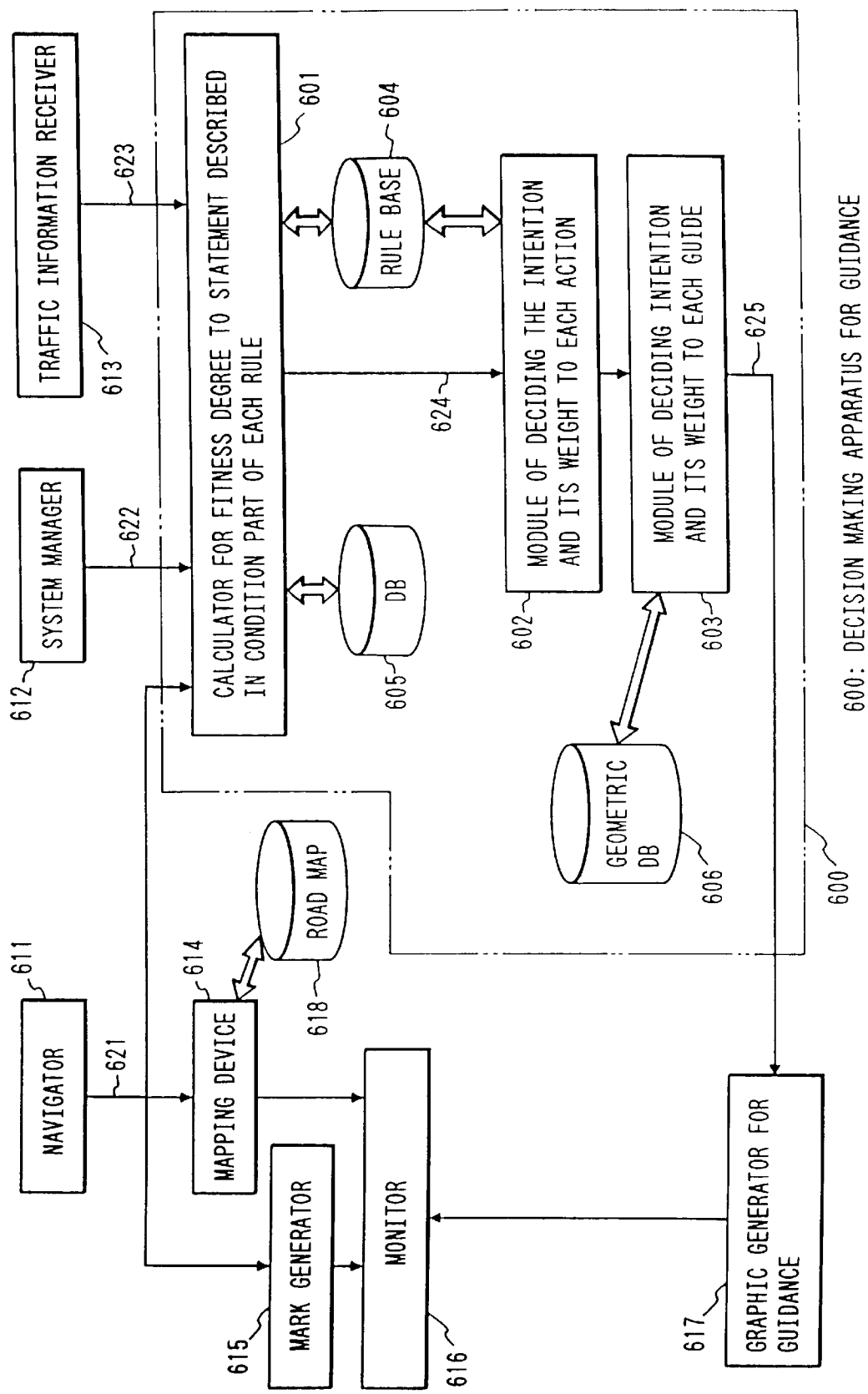
FIG. 12 is an architecture diagram of a navigation system having a guidance function for supporting a driver.

FIG. 12 is an architecture diagram of a navigation system having the guidance function for supporting a driver.

Own automobile position data (621) by a navigator (611), a system status (622) by a system manager (612), and traffic information (623) obtained by a traffic information receiver (613) are inputted to a decision making apparatus for guidance (600). The automobile position data (621) is also inputted to a mapping device (614) and a mark generator (615). The mapping device (614) obtains map data of an appropriate area on the basis of the own automobile position data with reference to the road map (618), makes a map, and displays it on a monitor (616). The mark generator (615) generates an own automobile position mark and superimposes and displays it on the map of the monitor.

In a rule base (604) of the decision making apparatus for guidance (600), a rule is described in an expression format of:

IF (status of A), THEN (conduct an action B)+(auxiliary verb of intention)

In a DB (605), the data for calculating the fitness degree to a certain statement is stored on the basis of the own automobile position data (621), the system status (622), and the traffic information (623).

In a geometric DB (606), information such as the road type, the public facilities, and the position of a gas station is stored. A calculator for fitness degree to a statement described in the condition part of each rule (601) calculates the fitness degree (624) to the statement described in the condition part of the rule with reference to the rule described in the rule base and the data stored in the DB on the basis of the own automobile position data (621), the system status (622), and the traffic information (623). A module of deciding the intention and its weight to each action (602) obtains the weight (625) of the intention described in the condition part of the rule with reference to the rule described in the rule base for each action. A module of deciding intention and its weight to each guide (603) decides an appropriate guidance direction for each action with reference to the geometric DB (606) and decides an intention to each guidance direction and its weight.

A graphic generator for guidance (617) generates a graphic for guidance from the intention to each aforementioned guidance direction and its weight and displays it on the monitor.

Figure 13:
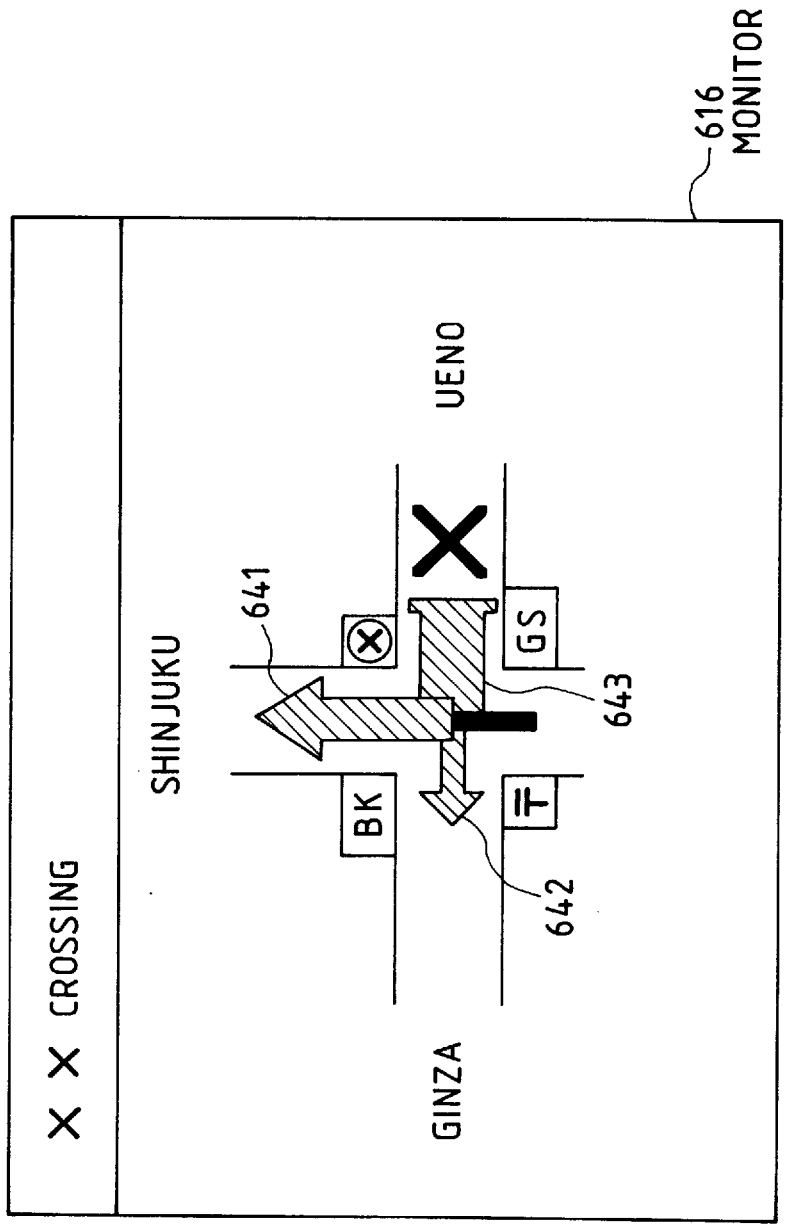
FIG. 13 is a drawing showing an example of a guidance display diagram.

FIG. 13 shows an example of a graphic generated by the graphic generator for guidance (617).

On a monitor (616), a drawing of a certain crossing is shown and a typical place name of each guidance direction is shown. For example, when the intention to guidance and its weight are as shown below:

Go straight: should: 0.8,
Turn left: may: 0.3, and
Turn right: must not: 1.0, the intention and weight are expressed by the length and thickness of the arrows of approach direction and the marks of approach inhibition. In this example, they are displayed as follows:

Go straight: arrow of approach with length 3: thickness 0.8 (641)

Turn left: arrow of approach with length 1: thickness 0.3 (642)

Turn right: mark of inhibition with length 4: thickness 1.0 (643)

An actual example of decision making will be explained hereunder.

In the rule base (606), for example, many rules such as those indicated below are stored.

IF (there is not much gasoline),
THEN (go to gas station) (must)
IF (standard route is congested with traffic),
THEN (bypass) (may)
IF (will be late for target arrival time),
THEN (run on expressway) (had better)
IF (standard route is closed),
THEN (pass through standard route) (must not)
IF (distance of bypass is too long),
THEN (bypass) (had better not)

The calculator for fitness degree to statement described in condition part of each rule (601) calculates the residual quantity of fuel from the system data (622) with reference to, for example, the condition part of the following rule of the rule base:

IF (there is not much gasoline),
THEN (go to gas station) (must)

and the data of the DB and calculates the fitness degree (for example, 0.6) to the status of "there is not much gasoline" from the fuzzy inference. The calculator calculates the following by the module of deciding the intention and its weight to each action (602):

"go to gas station": must: 0.6 and executes the aforementioned processing for all the corresponding rules and decides the intention to each action and its weight. The module of deciding intention and its weight to each guide (603) obtains, for example, the guidance direction ("turn left", "go to neighborhood of Ginza", etc.) with reference to the geometric DB (606), converts the intention to each action to an intention to guidance, and decides the intention to each guidance. For example, assuming that the intention to each action and its weight are as shown below:

"go to gas station": must: 0.6 and
"bypass": had better: 0.8 and "go to gas station" is converted to "turn left" and "bypass" to "turn left" or "turn right", the following are obtained.

"turn left": must: 0.6,
"turn left": had better: 0.8, and
"turn right": had better: 0.8.

When the intention of "turn left" is decided by the decision making method of the present invention, the following result:

"turn left": must: 0.6 and
"turn right": had better: 0.8.

The decision making apparatus for guidance can integrate these results and decide the final intention. However, since there is a large amount of insufficient traffic information included and it is desirable that a driver judges himself to a certain extent, these results are displayed so as to support decision making of a driver.

By using an auxiliary verb of intention in a rule like this, a driver can know the intention to guidance decided by the decision making apparatus by the size of the arrows of approach direction and the marks of approach inhibition and can easily judge selection of an appropriate road during running. Since graphical guidance information for some directions is supplied, a driver can interpret the result thereof freely.

(D) Automatic dealing of stocks

In the normal dealing of stocks, when the movement of stock price shows a certain tendency, a client requests or entrusts an expert with an order of "sell" or "buy". Next, a system architecture in which a rule for decision making of "sell" or "buy" can be set by the client and stocks are dealt automatically according to the intention to the action by the decision making apparatus will be explained.

Figure 14:
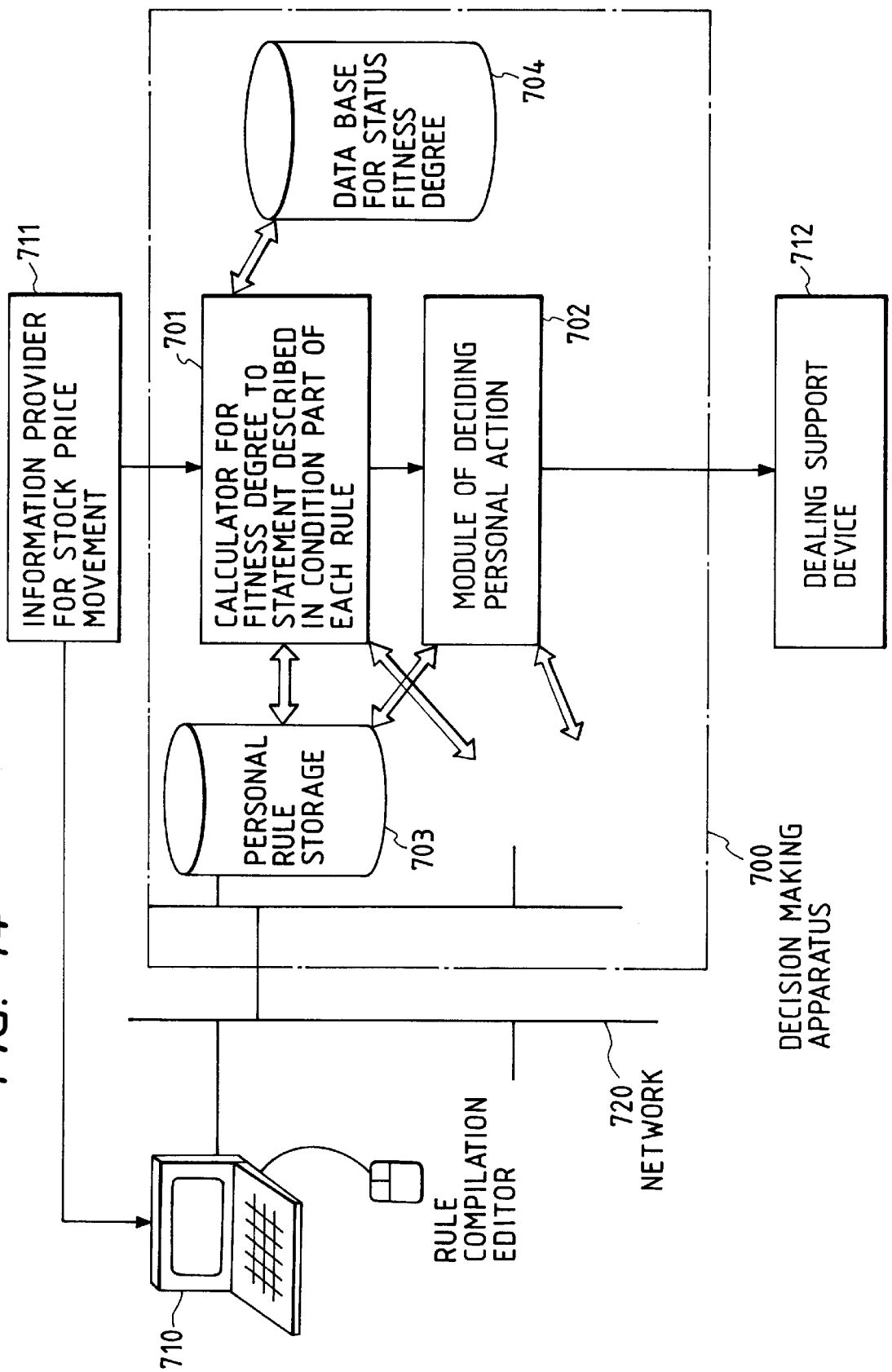
FIG. 14 is a system architecture diagram for automatically dealing stocks.

FIG. 14 is a system architecture diagram for automatically dealing stocks.

A client edits a rule of a personal rule storage (703) installed in a decision making apparatus (700) connected online by a network (720) using a rule compilation editor (710). This rule is set, for example, as shown below:

IF (stock price of A rises by about 10 yen),
THEN (automatically sold at stock price of A)+(may) or
IF (stock price of A does not rise much),
THEN (inform to client)+(must).

A client can re-edit a rule at any time with reference to the stock price movement information of an information provider for stock price movement (711).

In a decision making apparatus 700, a calculator for fitness degree to statement described in condition part of each rule (701) refers to the personal rule storage (703) per each person on the basis of the stock price movement information and calculates the fitness degree to statement of the condition part of the rule using the data of a data base for status fitness degree (704) and a module of deciding personal action (702) decides the intention to the action. When the result of decision making of the action is as shown below:

"automatically sell", "automatically buy" +auxiliary verb of intention, the order is automatically given to a dealer by a dealing support device (712).

When the result is as shown below:

"sell", "buy"+auxiliary verb of intention, the dealer ascertains it by the dealing support device (712) and then the order is given to the dealer.

Also when the result is as shown below:

"client is informed"+auxiliary verb of intention, the client is informed of it.

By using this apparatus, a client can decide the intention by his personal subjectivity and automatically deal stocks. A rule of an expression using an auxiliary verb of intention can be processed by a computer.

When a vehicle is autonomously operated, a strong intention can be assigned to a high-priority rule. For example, an action described in a rule relating to safety can be conducted on a priority basis. Also for an action which cannot be conducted simultaneously, the intention to the action can be decided properly.

In a public opinion survey, on the basis of survey results for an answer group using auxiliary verbs of intention, results can be derived such that, for example, when a strong intention has a majority, the intention is decided regardless of a weak intention, or an opinion of a minority group by the normal majority decision method can be reflected to decision making if it has a strong intention, or an opinion of a majority group is not always adopted if its intention is weak. Namely, the present decision making method can decide the representative opinion different from a majority method.

When an intention and its weight are decided, judgment of action decision of a human can be supported by displaying graphics.

Furthermore, when stocks or a plant is automatically dealt, a rule for dealing can be set by a client or a designer using an auxiliary verb of intention.

Having thus described the invention, we now claim:

1. A decision making method of deciding intentions to actions using rules including condition parts indicating statuses and conclusion parts indicating actions according to said condition parts, comprising:

a first step of deciding a strength of an intention by an auxiliary verb which indicates a strength of intention by a numerical value, to an action for each said conclusion part;

a second step of calculating a fitness degree indicating a fitness state of the status of each said condition part to the target status; and a third step of deciding a first rule as the intention to an action when the fitness degree of said first rule has a biggest fitness value and the auxiliary verb in said first rule has a biggest numerical value among said rules.

2. The decision making method according to claim 1 wherein when there are a plurality of actions, the intentions of which are to be decided simultaneously, further comprising:

(a) classifying said actions per each predetermined attribute;

(b) executing said first step to said third step for each classified attribute and deciding predetermined rules which are intentions to actions;

(c) deciding all said predetermined rules as intentions to actions when all said predetermined rules can be executed; and (d) deciding the intentions to be the actions of the executable rules on the basis of said fitness degrees and said strengths of intentions when all said predetermined rules cannot be executed.

3. The decision making method according to claim 1 further comprising:

a fourth step of calculating a new fitness degree from the fitness degree of the first rule on the basis of the fitness degree and a strength of intention of a second rule having a same strength of intention as said first rule when the fitness degree of the first rule is not highest among said rules;

a fifth step of deciding said second rule as an intention to an action when the fitness degree calculated at said fourth step or the fitness degree of said second rule, whichever is higher, is highest among said rules; and a sixth step of executing said fourth step and said fifth step for said second rule when one of the fitness degree calculated at said fourth step and the fitness degree of said second rule is not highest among said rules.

4. The decision making method according to claim 3, wherein when it is assumed that the strength of the intention of said first rule is L, and the fitness degree thereof is X, and the strength of the intention of the second rule is M, said fourth step calculates a new fitness degree from the formula $1 - M/L(1 - X)$.

5. The decision making method according to claim 3, wherein when it is assumed that the strength of the intention of said first rule is L, and the fitness degree thereof is X, and the strength of the intention of the second rule is M, and the fitness degree thereof is Y, said fourth step calculates a new fitness degree from the formula Y+−(M/L) X and when the calculated fitness degree is more than the predetermined value, said fourth step sets the fitness value to said predetermined value.

6. A vehicle controller comprising:

sensors for calculating data relating to the motion state of a vehicle at a predetermined time, a storage device for storing a rule comprising a condition part indicating a status and a conclusion part comprising motion of said vehicle corresponding to said status and an intention level indicating a strength of intention for performing said motion, a fitness degree calculator for calculating a fitness degree indicating a fitness state of said status of the condition part to the data calculated by said sensors at said predetermined time, a weight calculator for calculating the weight of the intention of the motion of said conclusion part on the basis of the fitness degree calculated by said fitness degree calculator, and a controller for controlling the motion of said vehicle according to the following conditions at said predetermined time;

(1) according to a first rule when said weight of intention of said first rule at the highest intention level is biggest among the rules stored in said storage device;

(2) means for converting the weight of intention of said first rule so as to fit a second rule at the next intention level of said first rule, by a formula 1−M/L (1−X), where L is the strength of intention of said first rule, X is the fitness degree and M is the strength of intention of the second rule, and ascertaining whether one of said calculated weight of intention and the intention level of said second rule is biggest when said weight of intention of said first rule at the highest intention level is not biggest among the rules stored in said storage device; and (3) means for repeating said converting until the weight of intention of the rule at the highest intention level is maximized according to the second rule when one of them is biggest or for said second rule when both of them are not biggest.

7. An analyzer of a public opinion survey assigning a strength of intention to each answer beforehand, comprising:

a support rate calculator for collecting answers to each question of a public opinion survey and calculating a support rate of each answer; and a representative answer decider for ascertaining whether the strength of intention of a first answer, the calculated support rate of which is highest, is biggest or not among all the answers, assuming said first answer as a representative answer of said public opinion survey when it is biggest, converting the strength of intention of said first answer, by a formula 1−M/L (1−X) (where L is the strength of intention of said first answer, M is the strength of intention of a second answer having a support rate next to said first answer, and x is the support rate of said first answer, when it is not biggest, and deciding a representative answer of said public opinion survey on the basis of the converted strength of intention.

* * * * *